United States Patent Office 3,523,375
Patented Aug. 11, 1970

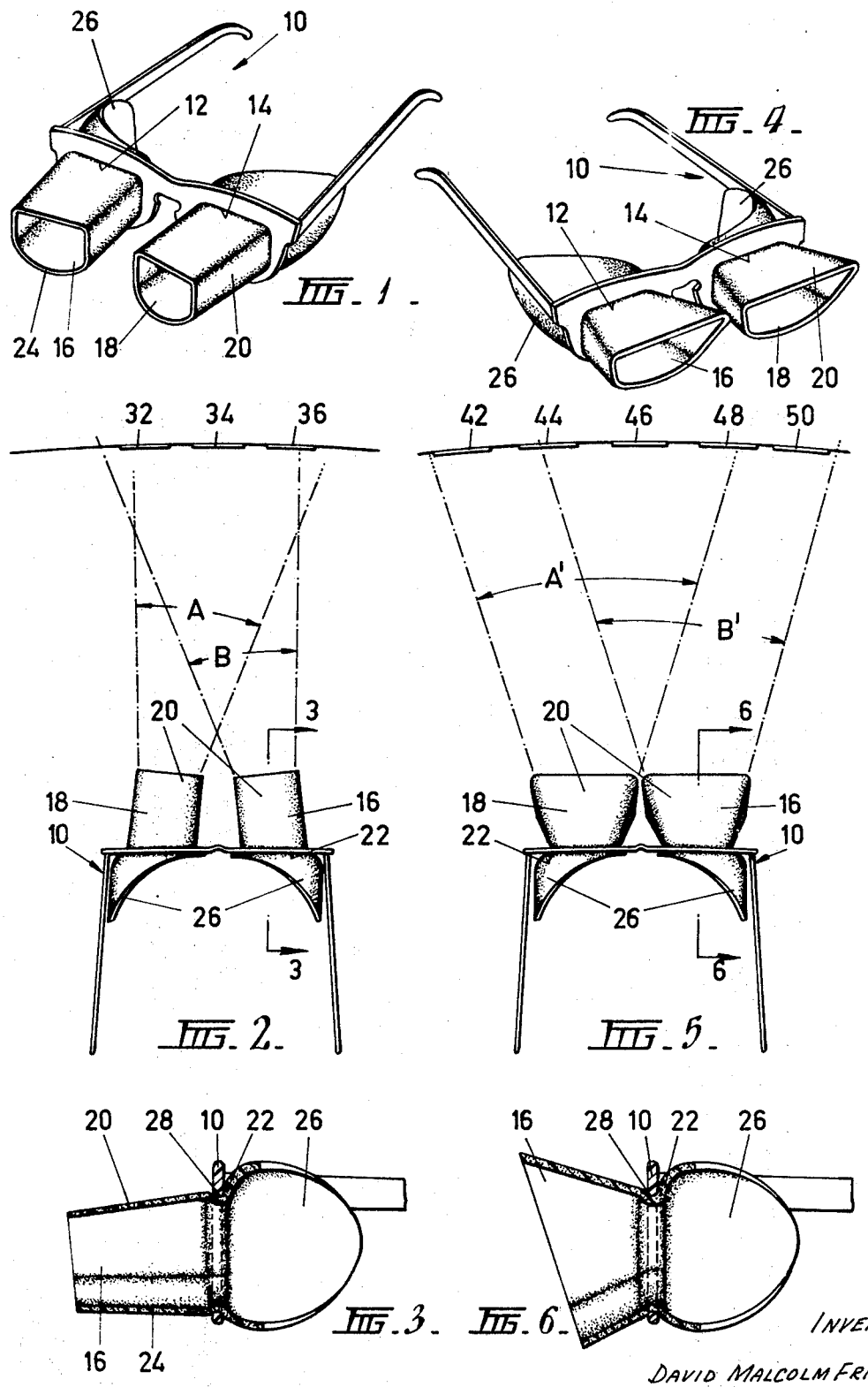

3,523,375
DEVICE FOR USE IN INSTRUMENT FLYING TRAINING
David Malcolm Frith, 8 Collins St., Melbourne, Victoria, Australia, and John Llewellyn Colvin, Hawthorn, Victoria, Australia; said Colvin assignor to said Frith
Filed Oct. 9, 1967, Ser. No. 673,801
Int. Cl. G09b 9/08; A61f 9/02
U.S. Cl. 35—12                                  6 Claims

ABSTRACT OF THE DISCLOSURE

To practice instrument flying, a spectacles frame without lenses is provided with elastic deformable inserts that extend in tubular fashion out in front of the frame. A cowling portion of the insert shaped to the face of the wearer extends behind the frame, and the tubular portion and cowling portion meet in a groove that surrounds the insert and releasably receives the margin of the lens opening of the frame so that the inserts are resiliently detachably retained in the frame.

---

This invention relates to a device for use in instrument flying training.

It is necessary for aircraft pilots to occupy a certain amount of flying time on instrument flying conditions in order that they should maintain proper efficiency for flying under these conditions in bad visibility, and there is therefore a need for means for obscuring from the vision of a pilot everything other than the six basic meters which are used for instrument flying in light aircraft. In the past various devices and systems have been proposed for this purpose but none of these has proved to be entirely satisfactory.

For example on some types of aircraft there are provided custom-made sliding screens which may be drawn across the windscreen to obscure the vision of the pilot. One disadvantage of such screens is that they are very expensive. In other types of aircraft maps, charts, or other large pieces of paper are used to cover the windscreen for instrument flying. In both of these cases there is the obvious disadvantage that the vision of the instructing or testing officer is obscured as well as that of the pilot, and this can introduce unnecessary hazards.

It is an object of this invention to provide simple and effective means which can be used by a pilot to obscure unwanted zones of vision and with this object in view the invention broadly resides in the provision of inserts constructed to be fitted in a spectacle frame and having screening walls which act to restrict the field of vision of the wearer to the desired zone.

More particularly an insert according to the invention may comprise a tube of substantially rectangular cross-section constructed for fitting within an aperture in a spectacle frame and having a portion thereof shaped to fit the portion of the head of a pilot surrounding the eye.

In accordance with a particular form of the invention which may be preferred spectacle frames are provided having in place of the usual circular or oval aperture an aperture of substantially rectangular shape, the longer sides of the rectangles extending horizontally when the spectacles are worn. The frame may be conveniently made of a plastic material of the nature normally employed for spectacle frames.

This particular form of the invention also includes the provision of inserts which are constructed to be fitted one within each rectangular aperture of the spectacle frame and comprising a length of tubing of substantially rectangular cross-section. The walls of the tubular portions of the inserts are comparatively thin thereby providing a cavity within the insert which is also of rectangular cross-section. The tubular portions are open at each end and at one end the tubular portion is integral with a cowling portion which is of enlarged cross-sectional area thus providing a flange at the junction of the tubular portion and the cowling portion.

The cowling portion is of oval cross-section and the edge thereof remote from the tubular portion is curved obliquely to correspond with the curvature of the human head in the region surrounding the eye. Hence the insert can be placed so as to fit neatly against the head surrounding the eye which can then see through the tubular portion, the axis of the tubular portion being more or less in line with the centre of the eye.

In use two inserts are fitted to a spectacle frame and when the user puts on the frame he is able to see through the tubular portions of the inserts but the vision of each eye is restricted to a rectangular zone by the respective insert.

While the general location of the basic flying instruments on modern aircraft is fairly standard, variations occur in the positions in which different pilots sit and for this reason it is desirable for each pilot to adjust his inserts in order to provide for himself the desirable pyramidal cones of vision.

For this reason it is proposed that the inserts be produced in a standard form with the lengths of the tubular portions being at least as long as ever likely to be desired by a particular pilot, and each pilot can then adjust his inserts to suit himself by cutting away portions of the tubular sections at the front until he finds that they give him a suitably high and wide zone of vision.

For some purposes pilots may desire to cut away portions of the inserts at the lower edges or at one side in order to enable them to see other instruments besides the basic flying instruments. In other cases the wall of the tubular portion may be concave upwardly for the same purpose.

The inserts are preferably constructed of a material of a flexible nature which can be readily folded for stowage on the person, but they should be of good elasticity to enable them to return to their original shape when free to do so.

A soft resilient construction is also desirable in order to avoid the inserts damaging the wearer in the event of an accident and it is also desirable that the inserts should be made of a material which is not inflammable and which would not sustain combustion in the event of a flash fire. A suitable material for the purpose is a plastic material such as polyvinyl acetate. Preferably the inserts are moulded from a blown foam plastic material in order to reduce their weight to a minimum.

If desired the inserts may be formed with a groove extending around the exterior surface of the tubular portions adjacent to the shoulder, such grooves being intended to fit the edges of the aperture in the spectacle frame. In this case the inserts are made with the exterior dimensions of the tubular portions larger than the apertures in the spectacle frame and they are distorted in order to fit them. Thus the frames engage in the recesses and the inserts are held firmly against accidental dislodgement.

In order that the invention may be more readily understood it will now be described by way of example with reference to two specific embodiments illustrated in the accompanying drawings wherein:

FIG. 1 is a perspective view of a first form of the invention;

FIG. 2 is a plan view of the form of the invention illustrated in FIG. 1;

FIG. 3 is a cross-sectional view on line 3—3 of FIG. 2;

FIG. 4 is a perspective view of a second form of the invention;

FIG. 5 is a plan view of the form of the invention illustrated in FIG. 4; and

FIG. 6 is a cross-sectional view on line 6—6 of FIG. 5.

Referring now to the drawings, it will be observed that in FIG. 1 there is provided a spectacle frame 10 of standard form, having apertures at 12 and 14 which, normally, are provided with lenses to correct optical defects in the wearer. Fitted within each aperture 12, 14 is an insert 16 or 18 respectively. Each insert has a tubular portion 20 which extends from a shoulder 22 forwardly through the associated aperture 12, 14, the inserts being so arranged that they converge somewhat towards each other, the angle of convergence being made to approximate the angle of convergence of the eyes of the pilot when viewing the instruments of the aircraft from a normal sitting position.

Each tubular portion 20 is approximately rectangular in cross-section, but has its lower wall 24 formed so that it is concaved upwardly so as not to restrict unduly the field of vision of the pilot in a downward direction.

Behind the shoulder 22 the inserts are formed with an enlarged cross-section which is approximately elliptical and has its rear edge 26 curved to match the shape of the average human head in this area. The inserts are made from a soft and self-supporting material and preferably edge 26 is fitted (by a process of trying on, shaving off high spots, trying on, shaving, trying, shaving, and so on) to match closely the head shape of the actual wearer so that maximum comfort is achieved.

A groove or recess 28 is formed around each insert adjacent shoulder 22 to assist in locating and retaining the insert. Preferably the inserts are held in position by means of a suitable adhesive, and they may be formed with internal grooves (not shown) concentric with grooves 28 to enable lenses to be fitted for use by pilots who normally wear spectacles.

The method of manufacture of the inserts is as follows:

A perforated metal plate has a number of mould forms or dies set up on its upper surface, each mould form or die being shaped in accordance with the desired internal shape of the inserts. Preferably an equal number of inserts for the left eye and the right eye are made simultaneously (i.e. the inserts are made in pairs). A sheet of suitable material, such as foamed polyvinyl acetate is placed over the dies, sealed around its edges, and heated. When the material has been sufficiently softened by heat, a vacuum is applied to the lower surface of the die plate to draw the sheet of foamed material down around the dies and to cause it to conform closely to the shape of the dies.

The heat is removed and the plastic material permitted to cool, after which the vacuum is broken, the sheet is released and is removed from the die. The individual inserts are then cut out of the sheet and are trimmed top and bottom.

Grooves or recesses 28 are formed by placing a ring conforming to the shape of the apertures in the spectacle frames around the inserts adjacent the shoulders 22 while the plastic material is in its softened state, and permitting them to remain in this position until after cooling has taken place. The positioning of the rings is facilitated by the fact that the inserts taper forwardly as illustrated in FIGS. 2 and 3.

The inserts of this first embodiment are suitable for use by pilots flying light aircraft which have only a small number of gauges which must be continuously monitored.

FIGS. 4 to 6 inclusive illustrate a second embodiment suitable for use by pilots of larger aircraft such as modern jet passenger liners. In such aircraft it is necessary for the pilot to monitor more than the six basic gauges referred to in connection with light aircraft. The walls of the tubular portion 20 are therefore shaped to diverge outwardly as shown in the drawings to give a wider field of vision, but still insufficient to permit the pilot to view anything external to the aircraft unless he raises his head.

The field of vision of the left eye for the embodiment illustrated in FIGS. 1 to 3 is within the angle A and the field vision for the right eye is within the angle B and it will be seen that it permits the gauges 32, 34 and 36 to be read. In the case of the second embodiment the field of vision of the left eye is within the angle A1 and that of the right eye within the angle B1, thus permitting the instruments 42, 44, 46, 48 and 50 to be read.

It has been found in practice that the inserts and spectacle frames according to the invention are extremely effective and are not subject to the disadvantages and problems which are experienced with previously known blind flying aids. For example, previously known metal hoods have been found to be heavy and uncomfortable, they are known to be a hazard in the event of an accident while wearing them, they are likely to be dislodged during movements which result in high acceleration, they tend to produce an effect of looking through a tunnel which sometimes has a tendency to induce vertigo, and they are difficult to fit and difficult to stow when they are not being used.

With the devices of the present invention the inserts can be readily removed from the spectacle frame which can then be folded and placed in the usual type of case while the inserts can be fitted together and folded or crumpled and placed in a comparatively small pocket.

The invention further comprehends the inclusion of optical lenses, if so desired, for the correction of refractive errors and/or glare, or for other purposes. With this in mind, the inserts may be constructed with recesses opening from the inner surface of the tubular portions in an appropriate position suitable to the eye, the recesses serving to house the edges of lenses of appropriate shape.

What is claimed is:

1. A device for use in instrument flying, comprising an insert of elastic deformable material constructed to be fitted into a lensless spectacles frame and having screening walls which act to restrict the field of vision of the wearer to a desired zone, said insert comprising a tubular portion adapted to project forwardly of the spectacles frame and a cowling portion adapted to project rearwardly of the spectacles frame and shaped to fit the part of the head of a pilot surrounding the eye, the cowling portion being of enlarged cross section as compared with the tubular portion thereby to provide a shoulder to locate the insert in a spectacles frame, there being an outwardly opening groove that encompasses the insert between the tubular portion and the shoulder of the cowling portion thereby releasably to retain the insert in the spectacles frame with the margins of a lens aperture of the frame seated in the groove.

2. A device as claimed in claim 1, wherein said insert comprises a tubular portion of substantially rectangular cross section.

3. A device as claimed in claim 2, wherein the lower wall of the tubular portion is concave upwardly to avoid undue restriction of the downward vision of the wearer.

4. A device as claimed in claim 1, said elastic deformable material being a foamed plastic material.

5. A device as claimed in claim 1, there being two said inserts disposed in a spectacles frame.

6. A device as claimed in claim 5, wherein the inserts converge toward each other at a small angle.

References Cited
UNITED STATES PATENTS

| | | | |
|---|---|---|---|
| 1,511,357 | 10/1924 | Nairne | 2—14.6 |
| 1,892,444 | 12/1932 | Bausch | 2—14 X |
| 2,024,322 | 12/1935 | Wittig | 2—14 |
| 2,425,522 | 8/1947 | Ellis | 2—14.1 |
| 2,694,263 | 11/1954 | Francis et al. | 35—12 |
| 3,133,982 | 5/1964 | Janz | 2—14.1 X |
| 3,225,459 | 12/1965 | Wilstein | 35—12 |
| 3,330,051 | 7/1967 | Pambello | 35—12 |
| 3,392,461 | 7/1968 | Jenison | 35—12 |

EUGENE R. CAPOZIO, Primary Examiner

P. V. WILLIAMS, Assistant Examiner

U.S. Cl. X.R.

2—14